(12) United States Patent
Zayas et al.

(10) Patent No.: US 7,035,931 B1
(45) Date of Patent: Apr. 25, 2006

(54) VOLUME LOCATION SERVICE FOR A DISTRIBUTED FILE SYSTEM

(75) Inventors: Edward R. Zayas, Salem, UT (US); Stephen G. Toner, Sundance, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/564,590

(22) Filed: May 3, 2000

Related U.S. Application Data

(63) Continuation-in-part of application No. 09/515,087, filed on Feb. 28, 2000.

(51) Int. Cl.
*G06F 15/16* (2006.01)

(52) U.S. Cl. ............... 709/229; 709/227; 709/228; 707/3; 707/10

(58) Field of Classification Search ............... 709/229, 709/227, 228; 707/3, 10, 103
See application file for complete search history.

(56) References Cited

U.S. PATENT DOCUMENTS

| | | | | |
|---|---|---|---|---|
| 4,611,298 | A * | 9/1986 | Schuldt | 707/1 |
| 5,012,405 | A * | 4/1991 | Nishikado et al. | 707/8 |
| 5,590,321 | A * | 12/1996 | Lin et al. | 707/10 |
| 5,649,168 | A * | 7/1997 | Huang et al. | 703/23 |
| 5,675,787 | A * | 10/1997 | Miller et al. | 707/104.1 |
| 5,699,518 | A * | 12/1997 | Held et al. | 709/229 |
| 5,729,730 | A * | 3/1998 | Wlaschin et al. | 707/3 |
| 5,761,678 | A * | 6/1998 | Bendert et al. | 707/204 |
| 5,893,087 | A * | 4/1999 | Wlaschin et al. | 707/3 |
| 6,023,706 | A * | 2/2000 | Schmuck et al. | 707/200 |
| 6,029,165 | A * | 2/2000 | Gable | 707/3 |
| 6,151,604 | A * | 11/2000 | Wlaschin et al. | 707/100 |
| 6,199,059 | B1 * | 3/2001 | Dahan et al. | 707/3 |
| 6,266,682 | B1 * | 7/2001 | LaMarca et al. | 715/501.1 |
| 6,311,194 | B1 * | 10/2001 | Sheth et al. | 715/505 |
| 6,360,225 | B1 * | 3/2002 | Kleewein et al. | 707/102 |
| 6,381,595 | B1 * | 4/2002 | Kleewein et al. | 707/4 |

(Continued)

FOREIGN PATENT DOCUMENTS

WO    WO 95/01605    1/1995

OTHER PUBLICATIONS

Schnatz, R.; Woznick, B., Bono, G., Burke, E., Geyer, S., Hoffman, M., MacGregor, W., Sands, R., Thomas, R. and Toner, S., *Cronus, A Distributed Operating System: Interim Technical Report No. 2*, Bolt Beranek and Newman, Inc., Report No. 5261, Feb. 1983 pp. 12-17, 31-33.

(Continued)

*Primary Examiner*—Ario Etienne
*Assistant Examiner*—LaShonda Jacobs
(74) *Attorney, Agent, or Firm*—Marger Johnson & McCollom, PC

(57) ABSTRACT

Software implementing a volume location service on a computer is responsible for instructing clients where they can find volumes on a distributed file system storing instances of desired resources. A user queries the volume location service software for the location of instances of a desired resource. The user can also specify attributes (e.g., read-only access) to reduce the number of returned hosts. The volume location service software accesses a back-end database for the hosts with the optional attribute storing resource instances. The back-end database stores information about what hosts store instances of what resources. The back-end database is pluggable, and can be changed as desired by the administrator of the volume location service. The volume location service software then returns to the user the found hosts.

15 Claims, 16 Drawing Sheets

U.S. PATENT DOCUMENTS

| | | | |
|---|---|---|---|
| 6,438,559 B1* | 8/2002 | White et al. | 707/103 R |
| 6,493,717 B1* | 12/2002 | Junkin | 707/102 |
| 6,496,828 B1* | 12/2002 | Cochrane et al. | 707/10 |
| 6,502,103 B1* | 12/2002 | Frey et al. | 707/103 R |
| 6,594,662 B1* | 7/2003 | Sieffert et al. | 707/10 |
| 6,732,117 B1* | 5/2004 | Chilton | 707/103 X |

OTHER PUBLICATIONS

Zayas, Edward R., *AFS-3 Programmer's Reference:BOS Server Interface*, Chapter 1, pp. 1-2, 65-70, Version 1.0, FS-00-D161, Transarc Corporation, Aug. 28, 1991.

Zayas, Edward R., *AFS-3 Programmer's Reference: Volume Server/Volume Location Server, Interface*, Chapter 1, pp. 1-2, Chapter 2, pp. 4-5, 14-15, 26, Version 1.0, FS-00-D165, Transarc Corporation, Aug. 29, 1991.

Zayas, Edward R., *AFS-3 Programmer's Reference: Architectural Overview*, pp. 13, 17-18, Version 1.0, FS-00-D160, Transarc Corporation, Sep. 2, 1991.

Microsoft Professional Developer's Conference 97 slides, San Diego, CA.

* cited by examiner

VOLUME LOCATION SERVICE FOR A DISTRIBUTED FILE SYSTEM

RELATED APPLICATION DATA

This is application is a continuation-in-part of co-pending U.S. Patent Application "Directory-Based Volume Location Service for a Distributed File System," Ser. No. 09/515,087, filed Feb. 28, 2000.

FIELD OF THE INVENTION

This invention pertains to distributed file systems, and more particularly to locating instances of a selected volume over the distributed file system.

BACKGROUND OF THE INVENTION

In conventional file systems, a client on a workstation can access a specific named volume on a specific named server. As the volume name is human-readable, there could be other volumes in the network with the same name on different servers, but these bear no relation to any other volumes with the same name. Products exist to replicate data between volumes on different servers, but the client is still required to specify which instance of a replicated volume it wants to access.

A Distributed File System (DFS) eliminates the strong tie between a file and the server on which it resides. With DFS, volumes still exist, but they can move between servers or have multiple instances that exist on different servers. The client specifies only the DFS volume name or its Global Unique Identifier (GUID) when accessing files. The advantages of DFS can be generalized to any kind of resource that can be distributed (e.g., printers, scanners, etc.). But without some mechanism to assist the client in finding to which physical server or servers the resource is attached, DFS is of limited value.

There have been several prior attempts to implement distributed file systems. The National Software Works (NSW), implemented by the Advanced Research Projects Agency (ARPA), included a single global volume distributed across multiple physical machines for file storage, a solution that did not scale well. Cronus, a distributed operating system research project undertaken by Bolt Beranek and Newman (BBN) under contract to the Rome Air Development Center (RADC), used a (statistically) unique name for the object as a clue to its location. But if the object was not known by that host (perhaps because it had been moved), the object would have to be located by broadcasting a message on the network. This approach did not scale well, and broadcasting messages can be difficult in any event. The AFS-3 file system by Transarc Corporation included a single back-end database implementation with a well-known name for the volume location servers. This approach is difficult to generalize, and has a single point of failure (the database). Microsoft used reparse points, which contain the full list of hosts where the volume instances can be found. But if a volume moves or a new instance is added, the reparse points must be modified, which is a difficult task.

Accordingly, a need remains for a mechanism that allows a client to locate instances of a resource given the resource's naming information that is easily scalable, includes redundancies for continued performance, and is easily updated as hosts and resource instances are added to or removed from the DFS.

SUMMARY OF THE INVENTION

A volume location service locates hosts storing instances of desired resources on a distributed file system. The volume location service receives a request from a client for a host storing an instance of a desired resource. The volume location service queries a back-end database for hosts storing instances of the desired resource. The query can be qualified by attributes for the resource instance based on the client's intended use of the resource instance. The back-end database identifies hosts storing instances of the desired resource with the qualifying attributes. The volume location service then returns the identified hosts to the client.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1A:
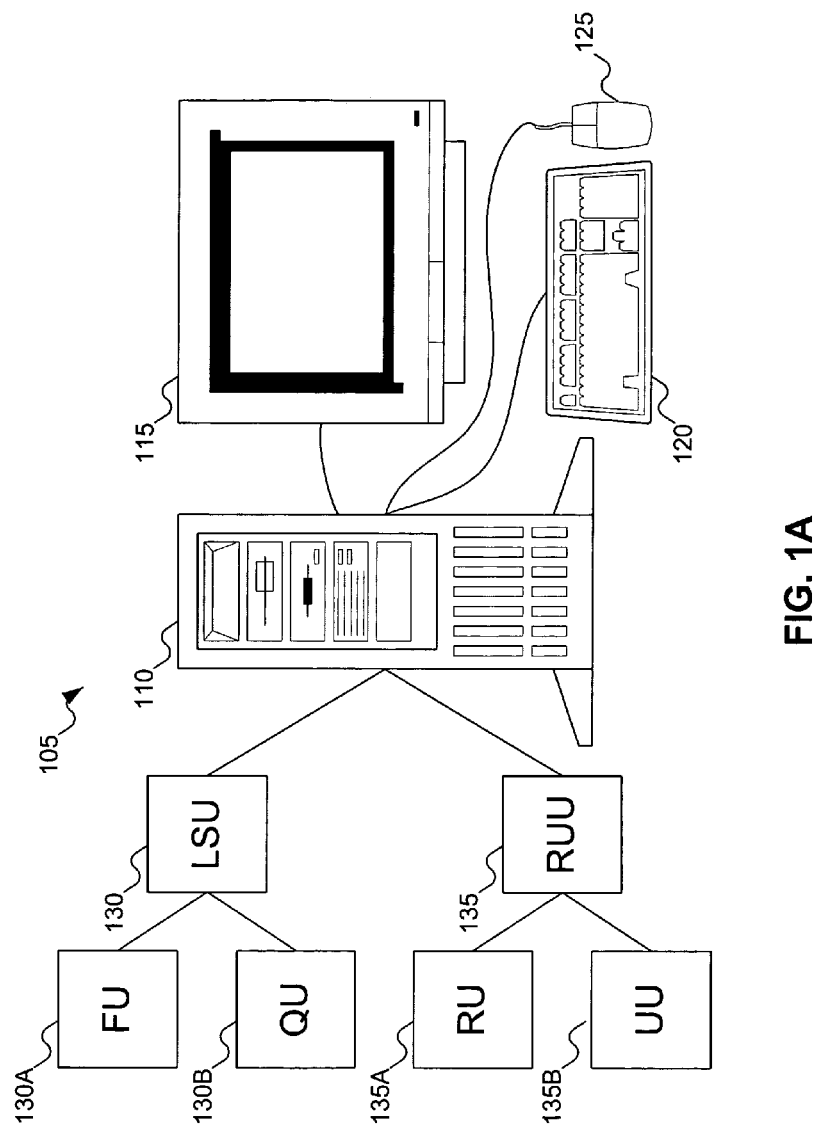
FIG. 1A shows a computer system on which the invention can operate.

FIG. 1A shows a computer system 105 on which the volume location service of the invention can operate. Computer system 105 conventionally includes a computer 110, a monitor 115, a keyboard 120, and a mouse 125. Optional equipment not shown in FIG. 1A can include a printer and other input/output devices. Also not shown in FIG. 1A are the internal components of computer system 105: e.g., a central processing unit, memory, file system, etc.

Computer system 105 further includes a location service unit 130 and a resource utilization unit 135. Location service unit 130 is responsible for finding a volume location service and querying that service for an instance of the resource. (Although the description of the preferred embodiment is directed toward locating volumes on a Distributed File System (DFS), a person skilled in the art will recognize that the method can be generalized to locating an instance of any type of resource that can be distributed over the network.) To that end, location service unit 130 includes two sub-units: finding sub-unit 130A and querying sub-unit 130B. Resource utilization unit 135 is responsible for receiving a pointer to a resource instance and utilizing that resource instance. To that end, resource utilization unit 135 includes two sub-units: receiving sub-unit 135A and utilization sub-unit 135B. In the preferred embodiment, location service unit 130 and resource utilization unit 135 and their sub-units are implemented in software.

Figure 1B:
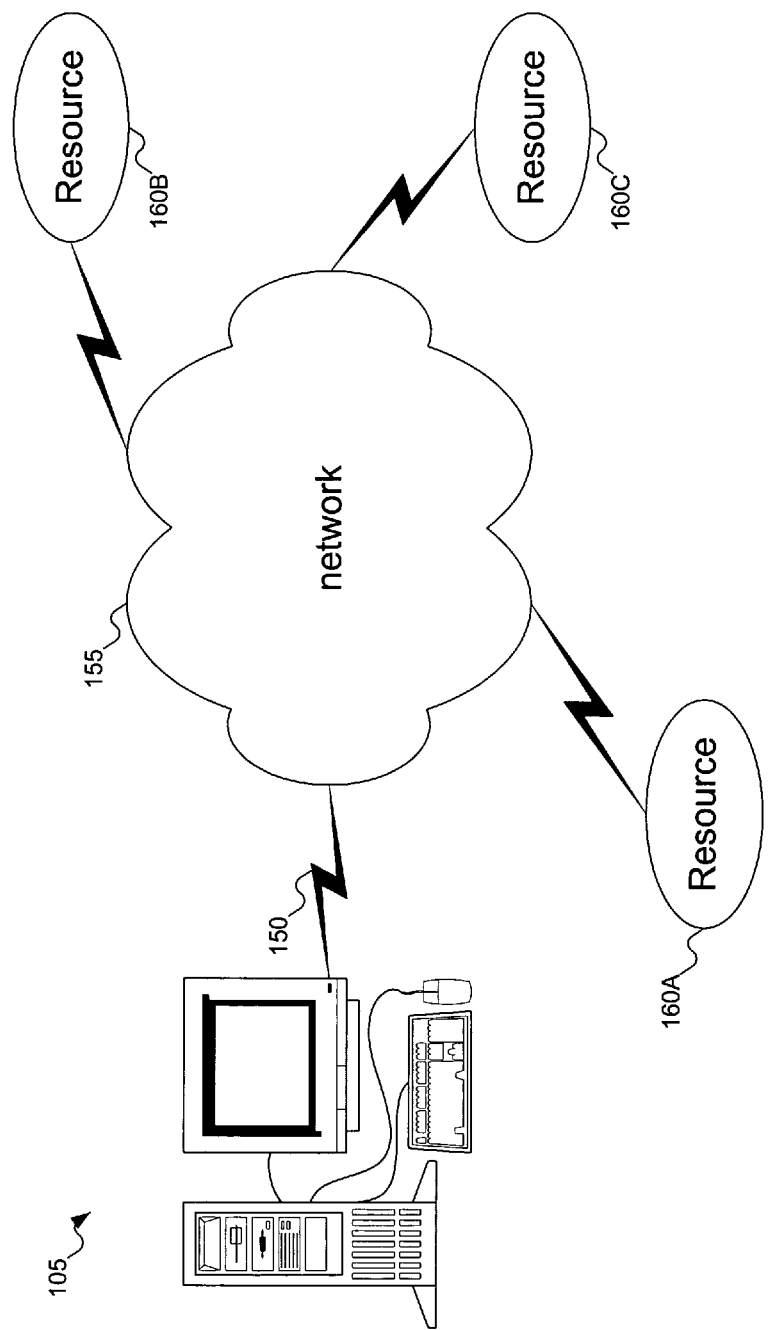
FIG. 1B shows the computer system of FIG. 1A connected to a network.

FIG. 1B shows computer system 105 connected over a network connection 150 to a network 155. By using network 155, resources, e.g., computers and their associated software facilities, peripherals, and data files, such as resources 160A, 160B, and 160C, are accessible. The DFS allows volumes that are physically located on remote servers to be viewed as part of the local hierarchy. A special type of link object called a junction allows references to the roots of other volumes, and ties the many volumes into a single hierarchy. Thus, rather than thinking about volumes and their physical connections to networks, it is preferable to view volumes as containers for their contents.

Figure 2:
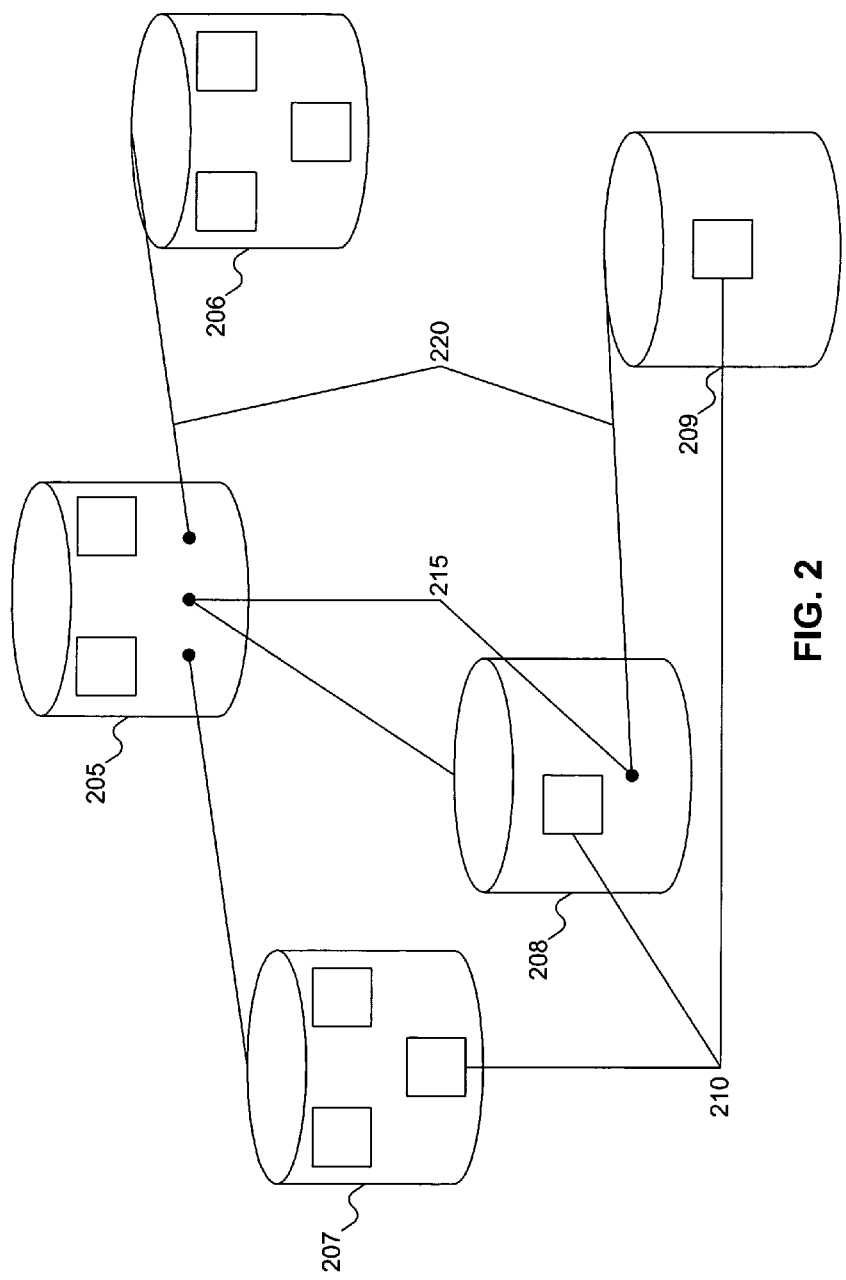
FIG. 2 shows a number of volumes in the Distributed File System for the network of FIG. 1B according to the preferred embodiment.

FIG. 2 shows a number of volumes in a DFS. Because volumes 205–209 can be located anywhere on the DFS, no particular organization is imposed on the volumes. Each volume can include objects 210. Objects 210 can include references to more volumes, file objects, or other resources. One particular type of object 210 is a junction 215. Junctions 215 organize the volumes into a hierarchy, represented by lines 220.

Figure 3:
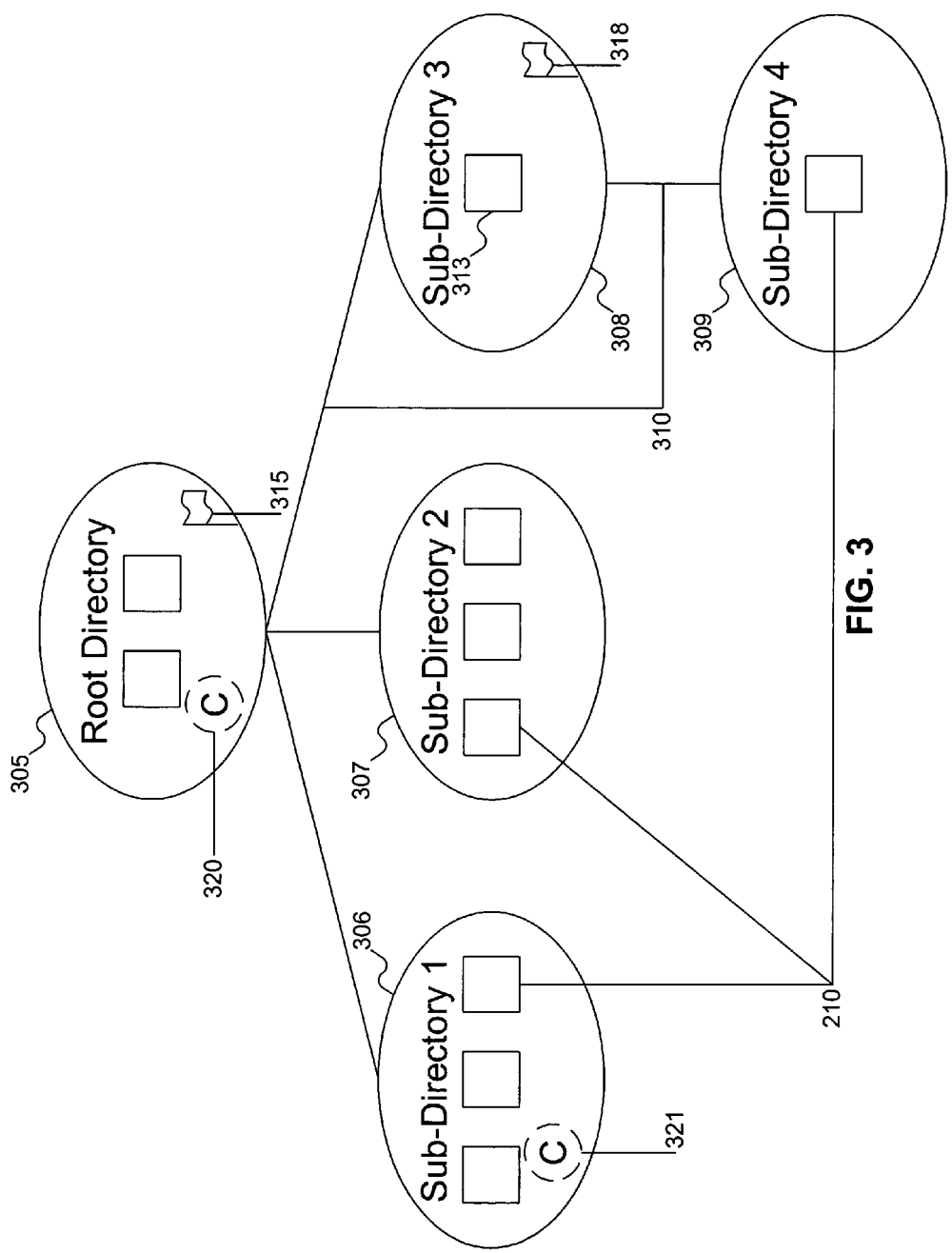
FIG. 3 is a tree structure showing the logical structure for the volumes of the Distributed File System in FIG. 2 according to the preferred embodiment.

FIG. 3 shows another way of viewing the logical structure of the volumes of FIG. 2. In FIG. 3, the logical structure is shown as a tree. The tree includes nodes 305–309, corresponding to volumes 205–209. Junctions are represented in FIG. 3 by lines 310 that hierarchically organize the nodes 305–309 into a tree. Each node has a Globally Unique Identifier (GUID) for a name. The assignment of GUIDs to nodes is known in the art. GUIDs are generally stored as 128-bit strings, and are statistically unique. Because GUIDs are generally not very meaningful to humans, a person skilled in the art will recognize that each node can have a second name. This second name will generally be human-readable, but is not guaranteed to be statistically unique. The human-readable name can also change over time without affecting the volume location service, which relies on the GUID of the volume being sought. Each node 305–309 can also include objects 210.

At the top of the tree is a root directory 305. Root directory 305 includes all other nodes, either directly or indirectly. There can only be one root directory. Root directory 305 is the outermost container in the network.

Figure 4:
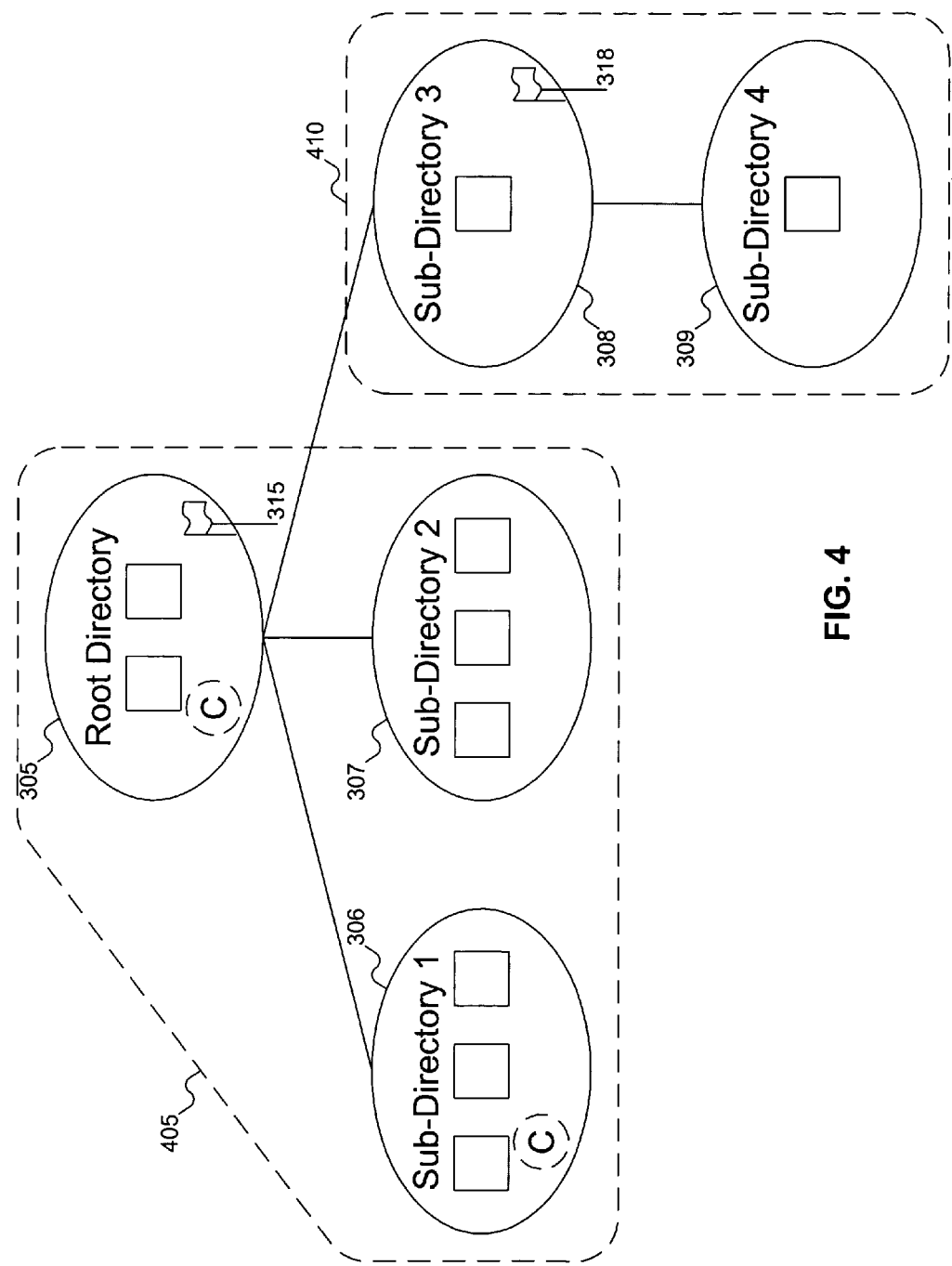
FIG. 4 shows how the tree of FIG. 3 is sub-divided into sets of nodes supported by different volume location services.
Figure 6:
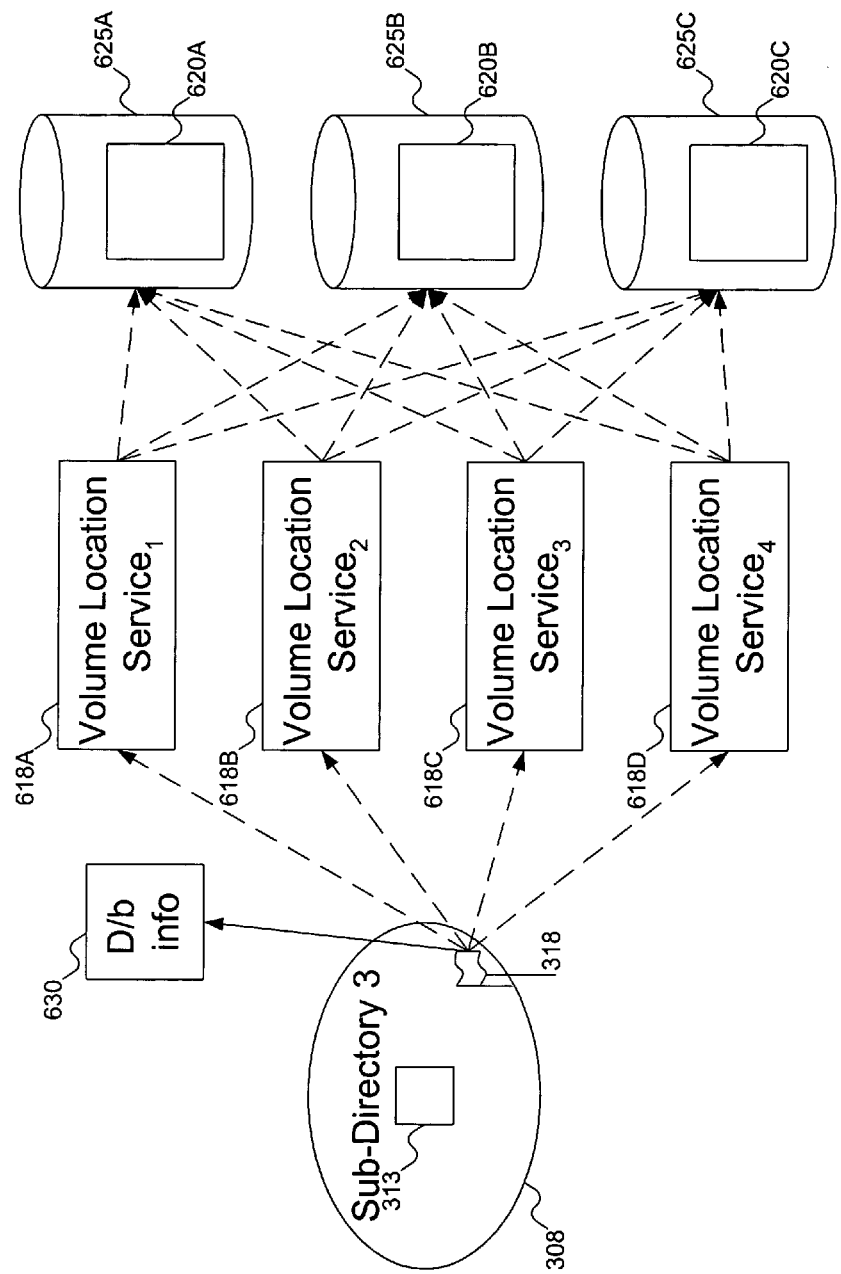
FIG. 6 shows how the volume location service can be used to locate an instance of the desired resource over the network of FIG. 1B.

Each node 305–309 can include an attribute tab, such as attribute tabs 315 and 318. (Attribute tabs 315 and 318 were not shown in FIG. 2 for simplicity.) Attribute tabs 315 and 318 store properties for the nodes to which they are attached (in FIG. 3, nodes 305 and 308 respectively). Attribute tabs 315 and 318 can be stored as data fields in the directory system, although a person skilled in the art will recognize that other techniques can be used to store attribute tabs. Each attribute tab 315, 318 gives the location of the volume location services for the node in the tree to which the attribute tab 315, 318 is attached, as shown in FIG. 6. The volume location services identified by attribute tab 315, 318 also service every node in the tree below the node in the tree to which the attribute tab 315, 318 is attached and that is not covered by another attribute tab. For example, because node 308 includes attribute tab 318, the volume location services identified by attribute tab 318 service nodes 308 and 309. Attribute tab 315, therefore, does not service nodes 308 or 309. FIG. 4 shows graphically which nodes in the tree are serviced by which attribute tabs. Attribute tab 315 services nodes 305, 306, and 307 (shown by grouping 405); attribute tab 318 services nodes 308 and 309 (shown by grouping 410). Because each node in the tree must be serviced by a volume location service, root node 305 must include attribute tab 315; an attribute tab is optional for all other nodes in the tree. How attribute tabs are used to locate a resource instance is discussed below with reference to FIG. 6.

The hierarchy of the DFS establishes a management context for each object in the tree. The "management context" is the set of nesting containers containing the object of interest. So, for example, the management context for object 313 includes "Root Directory/Sub-Directory 3." In general, clients will know the human-readable name but not the GUID. Using the management context, objects with the same human-readable name but different management contexts can be distinguished, and the correct GUID obtained from the DFS for use with the volume location service.

Figure 5:
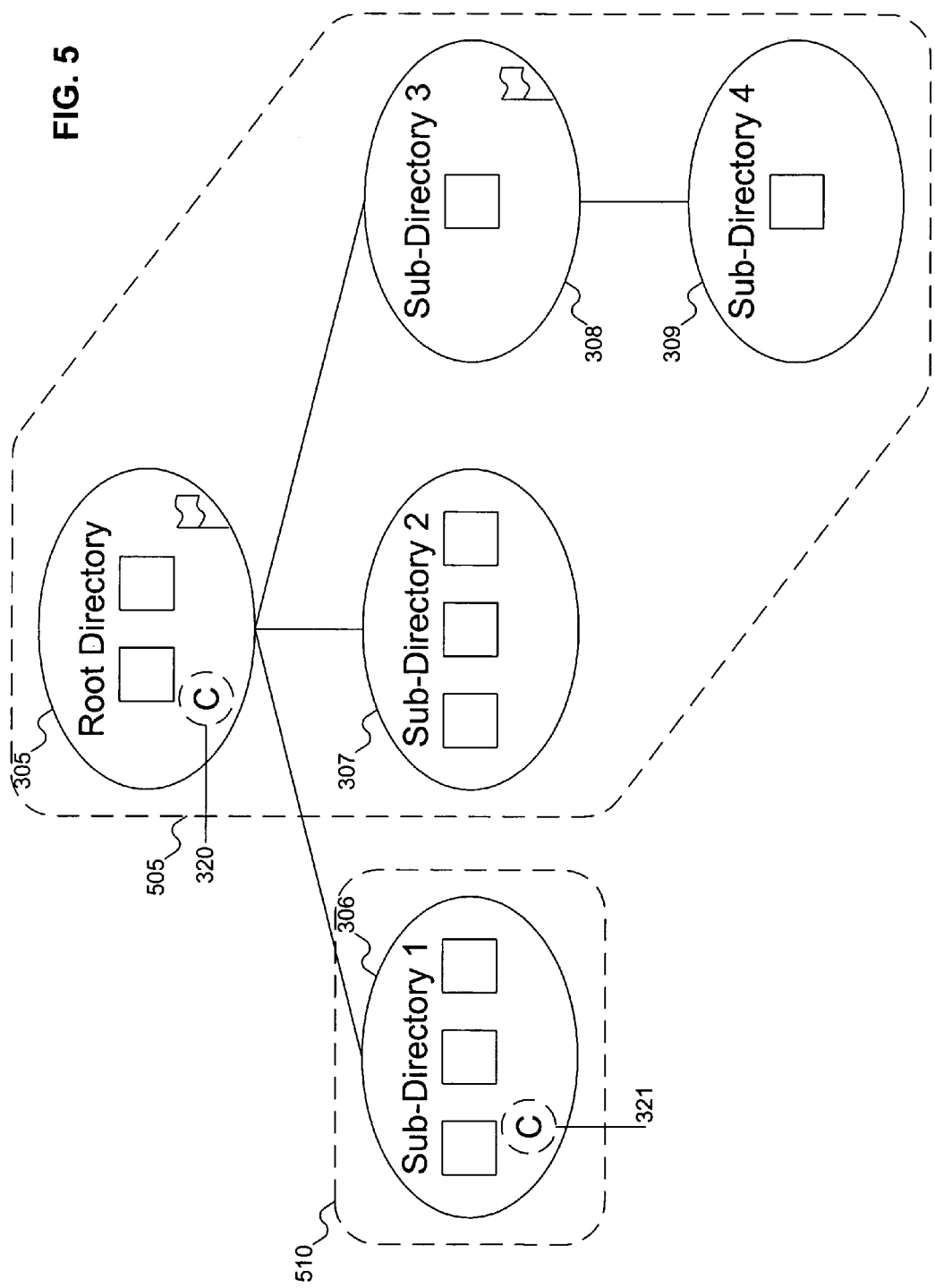
FIG. 5 shows how the tree of FIG. 3 is sub-divided into set of nodes for which different semantic contexts are to be applied to the network of FIG. 1B.

Returning to FIG. 3, each node in the tree can also optionally include a semantic context, such as semantic contexts 320 and 321. (Semantic contexts 320 and 321 were not shown in FIG. 2 for simplicity.) Semantic contexts 320 and 321 for the node specifies how the network is to be viewed in using the network. (The term "semantic context" in this connection is not to be confused with the term "management context," discussed above.) Semantic contexts 320 and 321 can be stored as data fields in the file system, although a person skilled in the art will recognize that other techniques can be used to store semantic contexts. As with attribute tabs, the semantic context to be applied to the network is determined by locating the lowest level container containing the desired object with an attached semantic context. For example, node 305 has attached semantic context 320, and node 306 has attached semantic context 321. FIG. 5 shows graphically which nodes in the tree are serviced by which semantic contexts. Semantic context 320 services nodes 305, 307, 308, and 309 (shown by grouping 505); semantic context 321 services node 306 (shown by grouping 510). Semantic context will be discussed further below with reference to FIGS. 8A–8B, 9, and 10.

A person skilled in the art will recognize that, although the above discussion talks about locating volumes, volume location services can locate other types of resources. For example, printers are a type of resource that can be distributed across a network. Network administrators can add and remove printers at any time without informing users of the change in available printers. When a printout is needed, the first step is determining the best printer for the job. Volume location services can locate printer resources just as easily as they can locate volumes. Of course, resources such as printers may not be identical. For example, printing black-and-white text on color printers is generally more expensive than printing black-and-white text on a black-and-white printer, but it is possible. Thus, the volume location service for physical resources locates the resources themselves, not instances of the resource, as with electronic resources (where every copy is absolutely identical).

FIG. 6 shows how a client can use the volume location service to locate an instance of the desired resource. In FIG. 6, the desired resource is the object 313. Because object 313 is contained in node 308 and node 308 has an attached attribute tab 318, the volume location service pointed to by attribute tab 318 is used. Attribute tab 318 points to volume location services 618A–618D. In FIG. 6 there are four copies of the volume location services; however, a person skilled in the art will recognize that there can be more or fewer volume location services. Assume that the client uses volume location service 2 (618B). The client provides volume location service 2 (618B) with the GUID of object 313. As discussed above, the GUID can be obtained from the DFS if the management context is known. Volume location service 2 (618B) then accesses a distributed database to determine where instances of the desired object are located. In FIG. 6, volume location service 2 (618B) would inform the client that instances 620A–C of the desired object can be found in containers 625A–C. The client can then select which instance of the desired object it wishes to access. In FIG. 6 there are three instances of the resource; however, a person skilled in the art will recognize that there can be more or fewer resource instances.

Attribute tab 318 can also include other information about the volume location service. A typical use can be to specify the database the volume location service is to use, as shown by database information 630. When the volume location service starts, it finds attribute tab 318 within the management context and loads the database indicated by database information 630.

Other uses exist for database information 630. For example, this additional information enables the client to make its request more intelligent. For example, database information 630 can specify how tightly the data within the database is replicated to other copies of the volume location service. If the client is requesting the location of a read-only copy of a resource from the volume location service and the database is loosely replicated, the client can then cache that copy until the database will be updated. Later requests for access to a read-only copy of the resource can be directed to the cached copy, avoiding the need for an additional request to the volume location service. A person skilled in the art will recognize that other attributes of the volume location service can be presented to the client through the attribute tab.

Figure 7:
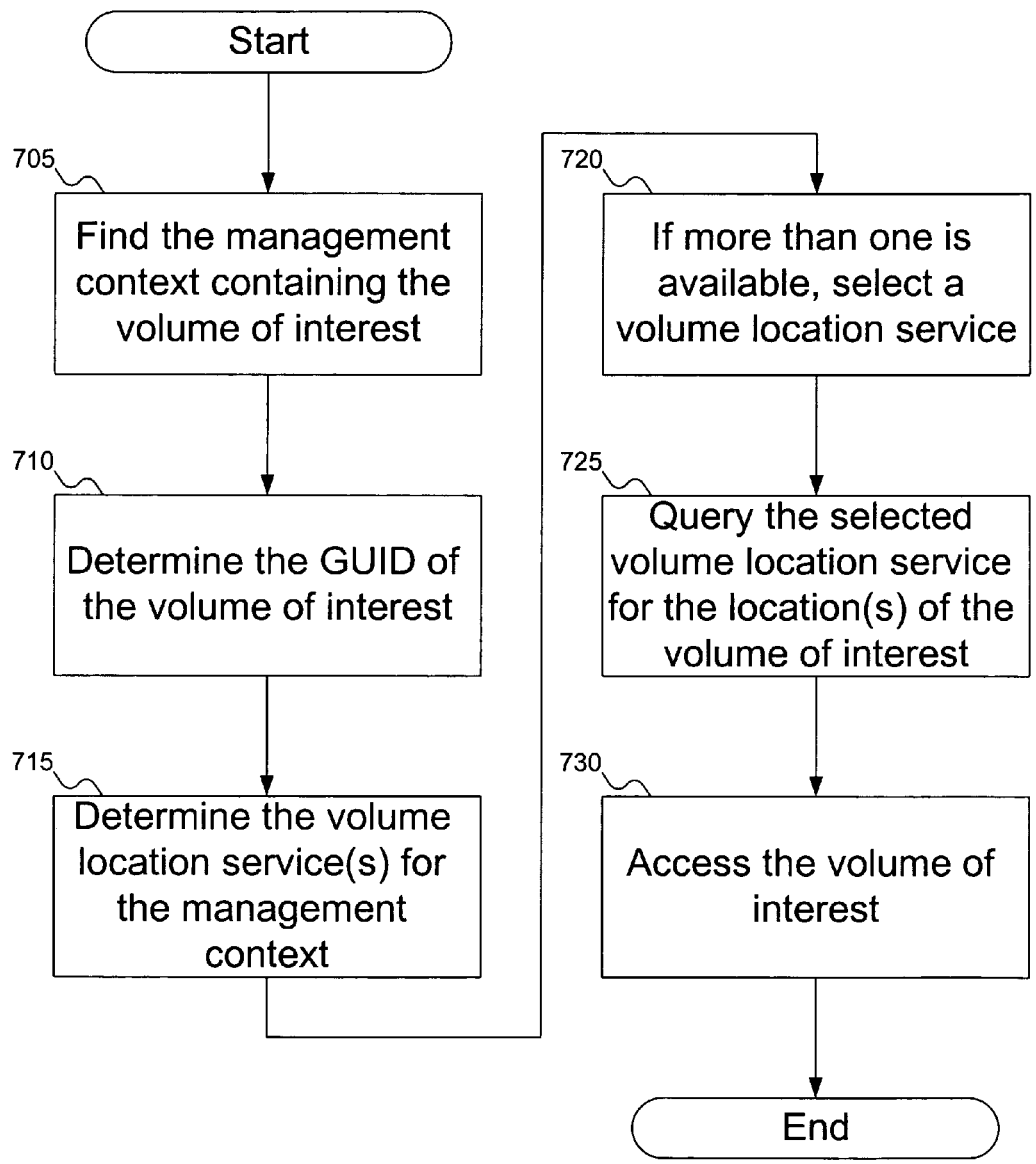
FIG. 7 is a flowchart showing how to use the volume location service to locate a volume according to the preferred embodiment.

FIG. 7 shows a flowchart of the steps a client takes to use the volume location service. At step 705, the management context containing the volume of interest is determined. Then, at step 710, the GUID of the volume of interest is determined. As discussed above, given the volume's human-readable name and its management context, the GUID is easily determined. A person skilled in the art will also recognize that the steps of determining the management context for a volume of interest and the GUID of the volume of interest are completely separate. Therefore, the order of the steps can be interchanged. At step 715, the volume location service(s) for the management context are determined. At step 720, if more than one volume location service is available, one of the available volume location services is selected. At step 725, the selected volume location service is queried to locate an instance of the desired volume. A person skilled in the art will recognize that, if the selected volume location service cannot be accessed, steps 720 and 725 can be repeated to select an alternate volume location service. Finally, at step 730, the located instance of the desired volume is accessed. If more than one instance of the desired volume is located by the volume location service, the client can access any one of the instances.

At this point, a person skilled in the art will recognize that, by taking advantage of the volume location service, administration of the resource instances can be done entirely behind the scenes, without the assistance of a system administrator. As resource instances are added or removed, the DFS can use the volume name and management context to automatically inform all volume location services of the changes. The system administrator does not need to deal with the particulars of updating the volume location service. In the preferred embodiment, this is even further generalized: the DFS only needs to inform one volume location service of the change. The informed volume location service then passes the update to the other volume location services within the management context for the volume. See below with reference to FIG. 14 for more information.

Figure 8A:
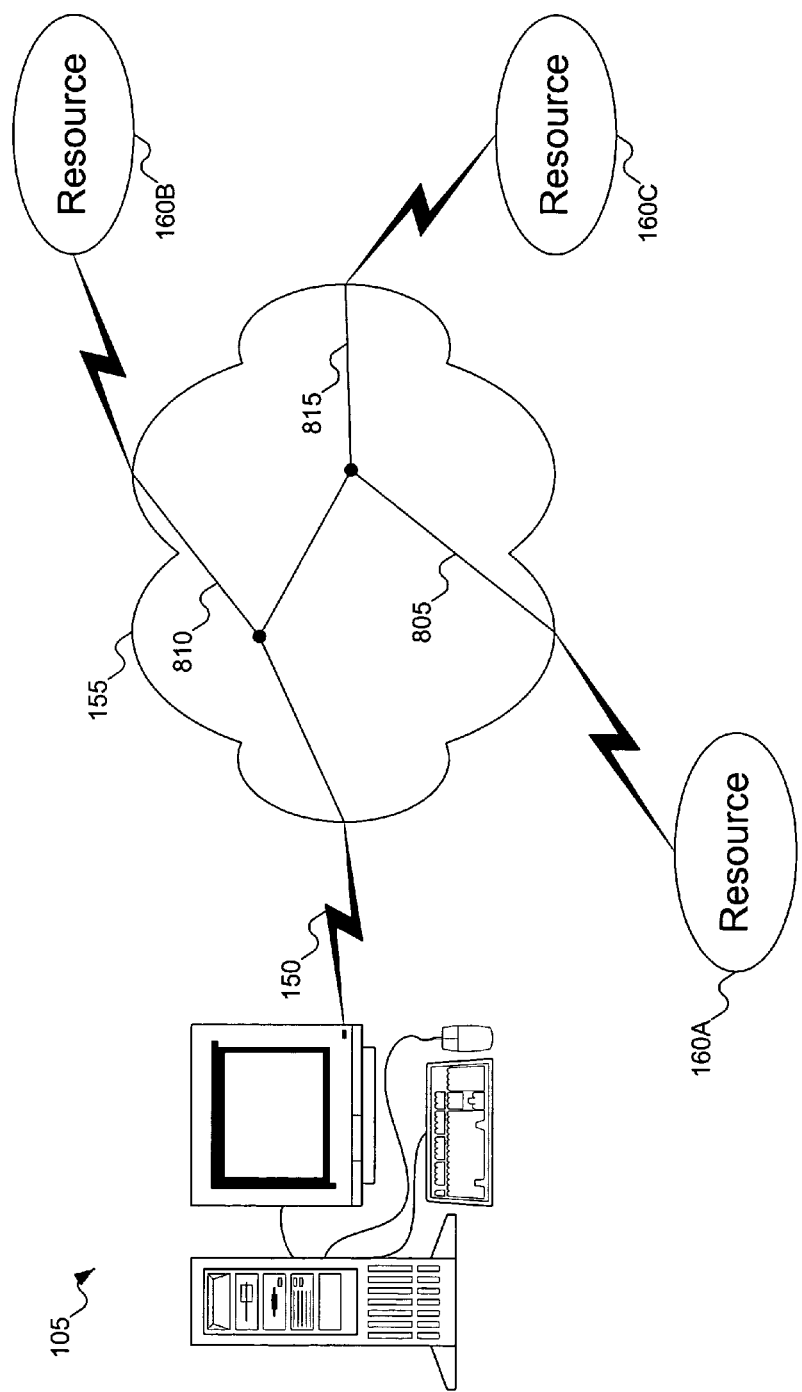
FIGS. 8A–8B show the effect of applying a semantic context to the network of FIG. 1B.
Figure 8B:
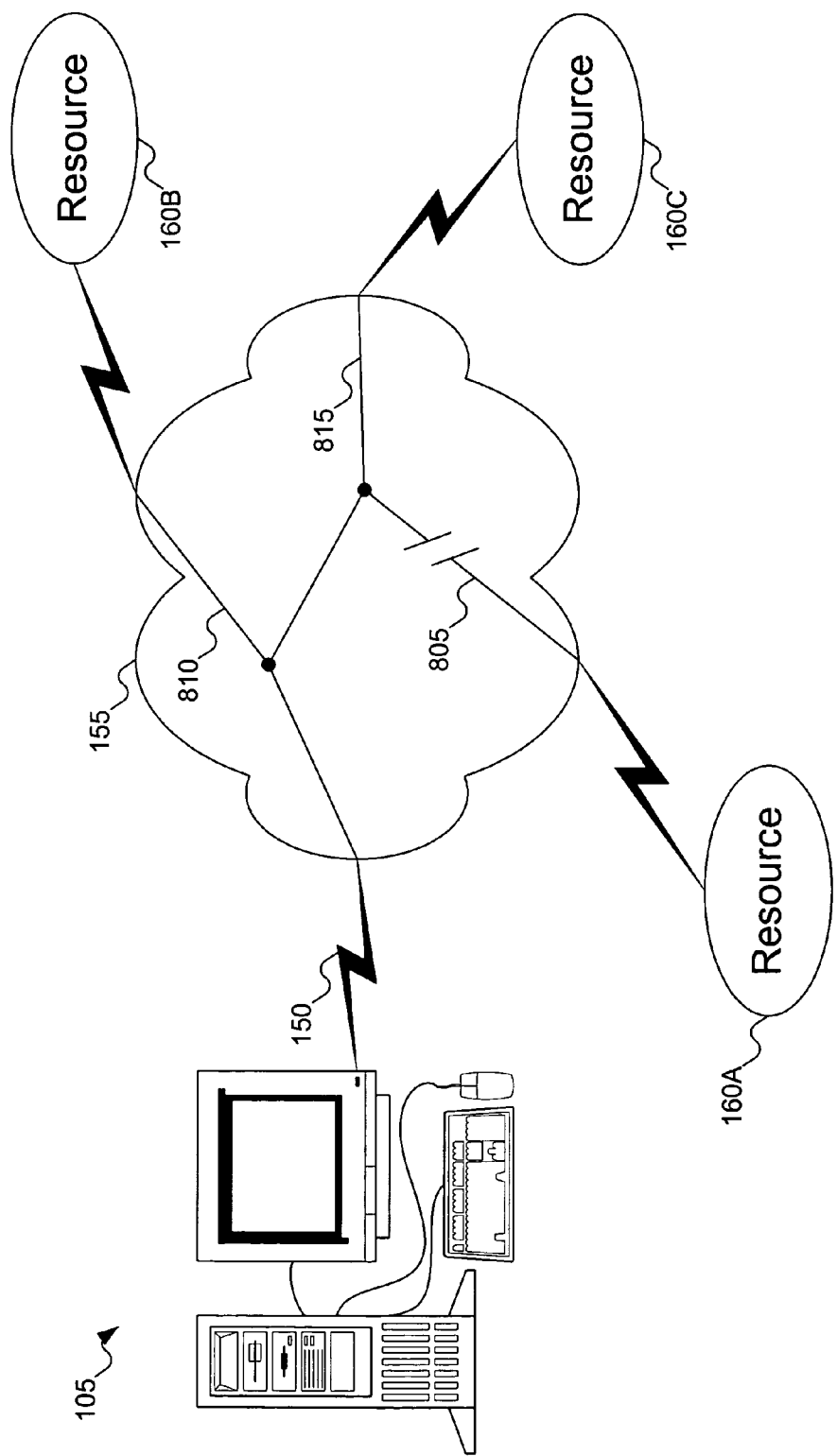

FIGS. 8A–8B show the effect of applying a semantic context to the network. As a reminder, a semantic context determines how the network should be viewed while locating a resource instance. In FIG. 8A, the volume location service has identified three instances 160A–C of the resource desired by the client. Instances 160A–C and computer 105 are connected by network 155, which includes, among other links, lines 805, 810, and 815. At this point, before a semantic context is applied, based solely on the number of hops required to reach the resource instance, resource instance 160B is the closest resource instance to computer 105. For example, if the resource the client desires is a printer, resource 160B may be the printer physically closest to the client. (As discussed above, with physical resources, the volume location service locates the resource itself, and not an instance of the resource.)

In FIG. 8B, a semantic context has been applied to network 155. The semantic context specifies a specific policy for resource instance access and usage. For example, continuing with the example of the desired resource being a printer, the semantic context has specified that resource 160A is not available to the client. Perhaps the printer is reserved for certain users, or is in a secure location inaccessible to the client. The specific reason is not important. Applying the semantic context effectively "cuts" link 805 (e.g., by making the cost of using link 805 infinite), and this denies the client access to resource 160A.

The semantic context can also change the relative priority of the resource instances. Continuing with the example of the desired resource being a printer, resource 160B may be a color printer, whereas resource 160C is a black-and-white printer. If the client only needs to print text, the semantic context can increase the cost of selecting resource 160B, "encouraging" the use of resource 160C.

Although the discussion of FIGS. 8A–8B focused on applying a semantic context to resource instance selection, semantic contexts can also be applied in selecting volume location services. Thus, in locating a resource instance, two semantic contexts may be applied: one to select the volume location service, and one to select the resource instance.

As discussed above with reference to FIG. 3, semantic contexts can be attached to nodes in the tree. This allows for semantic contexts to be inherited and automatically applied. Alternatively, semantic contexts can be applied specifically to individual network uses (for example, by a system administrator).

Figure 9:
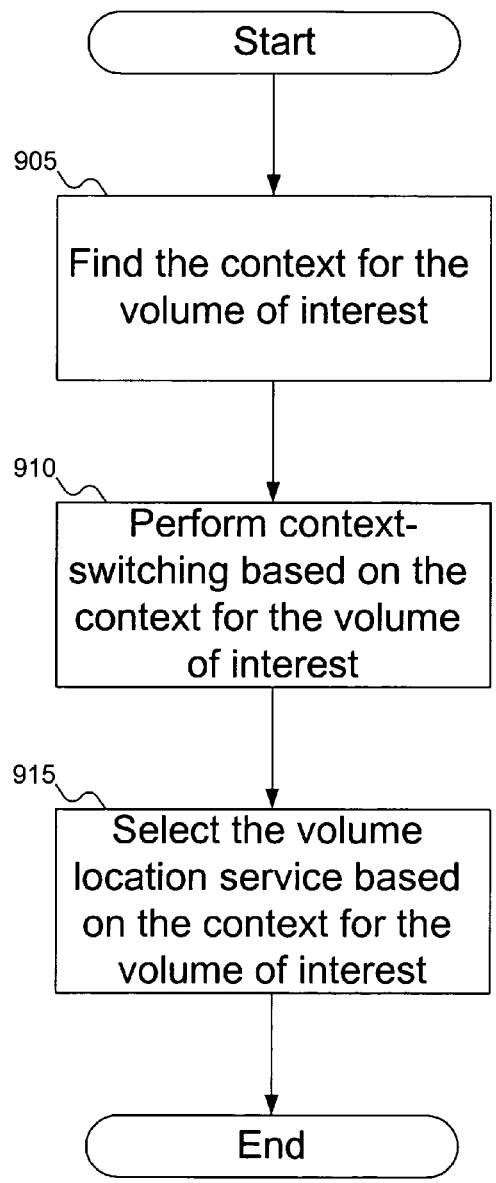
FIG. 9 is a flowchart showing how to apply a semantic context in selecting a volume location service according to the preferred embodiment.

FIG. 9 shows the steps taken to apply a semantic context in selecting a volume location service. At step 905 the semantic context for the volume of interest is located. At step 910, the network is context-switched based on the located semantic context. Finally, at step 915, a volume location service is selected based on the semantic context applied to the network.

Figure 10:
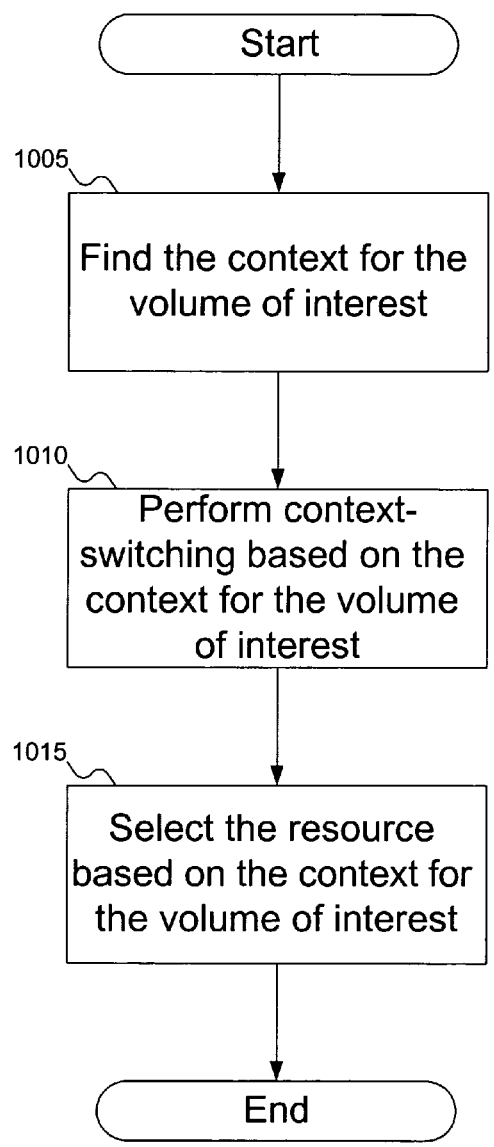
FIG. 10 is a flowchart showing how to apply a semantic context in selecting a resource instance according to the preferred embodiment.

FIG. 10 shows the steps taken to apply a semantic context in selecting a resource instance. At step 1005, the semantic context for the resource name is located. At step 1010, the network is context-switched based on the located semantic context. Finally, at step 1015, a resource instance is selected based on the semantic context applied to the network.

Figure 11:
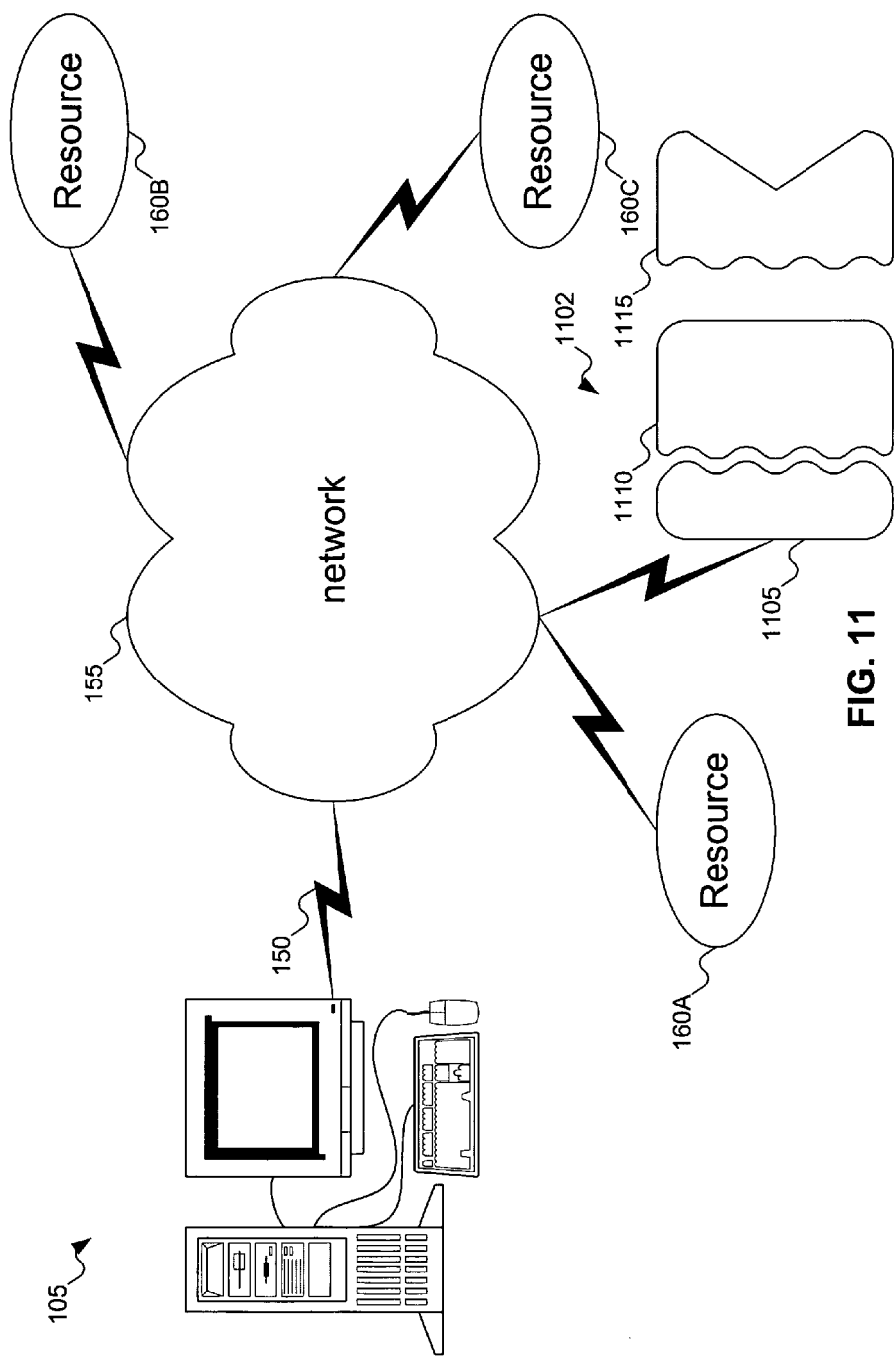
FIG. 11 shows a volume location service accessible to a client to locate resources over the network of FIG. 1B.

FIG. 11 shows volume location service 1102 accessible to a client to locate resource instances over the network of FIG. 1B. In FIG. 11, volume location service 1102 includes two parts: interface 1105 and back-end database 1110. Interface 1105 gives all clients an identical interface to volume location service 1102. This avoids clients having to learn particular formats for requesting volume locations from individual volume location services. Back-end database 1110 stores the locations of volumes storing instances of the desired resources. Back-end database 1110 is pluggable, and can be replaced by a different back-end database if desired. For example, instead of back-end database 1110, volume location service 1102 could use back-end database 1115. In the preferred embodiment, each instance of the volume location service for a particular management context uses the same back-end database. This simplifies the process of synchronizing the back-end databases. (There are no requirements governing the choice of back-end databases across different management contexts in the preferred embodiment.) However, a person skilled in the art will recognize that different back-end databases can be used for different volume location services in a particular management context, at the expense of more complicated synchronization operations. In the preferred embodiment, communications with volume location service 1102 are asynchronous: that is, if multiple requests are received by volume location service 1102, the responses are not guaranteed to be in any particular order.

Figure 12:
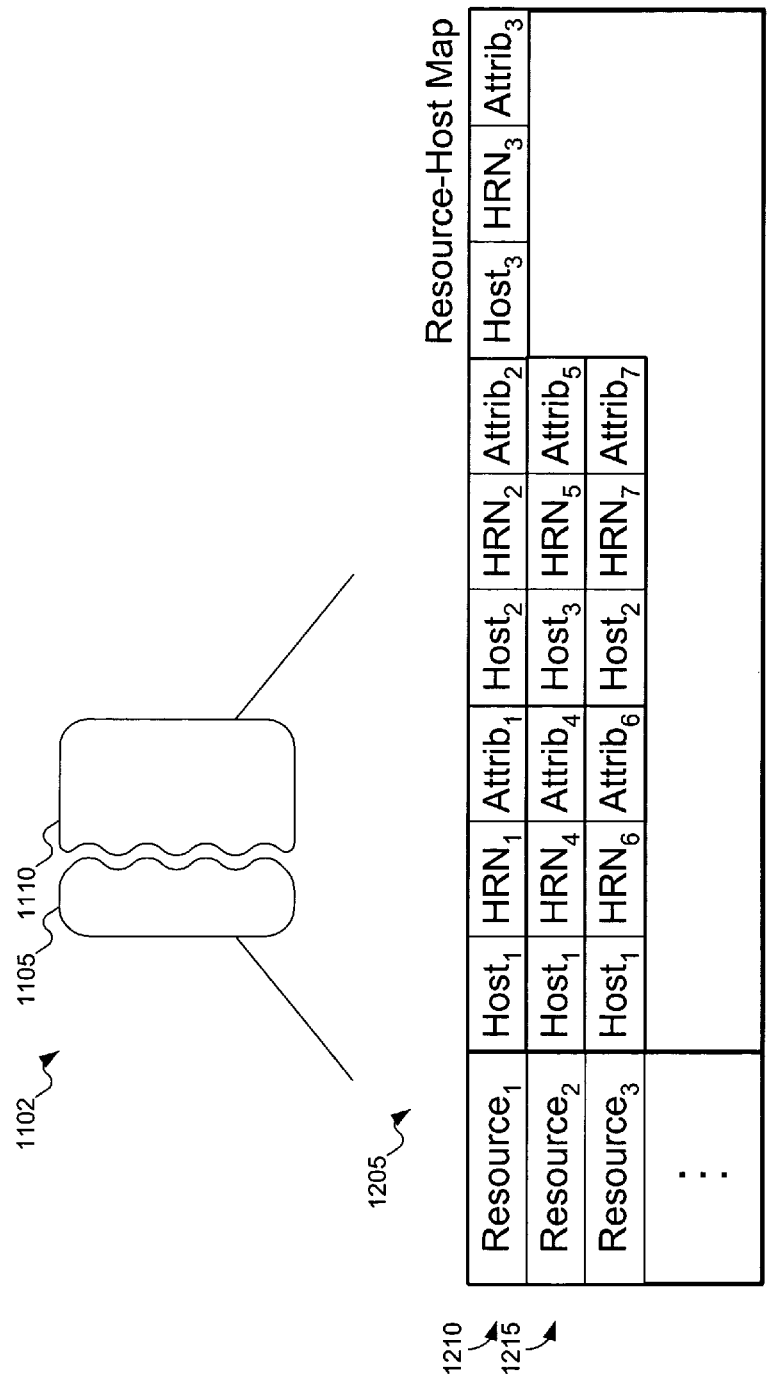
FIG. 12 shows the volume location service of FIG. 11 in greater detail.

FIG. 12 shows volume location service 1102 of FIG. 11 in greater detail. In FIG. 12, back-end database 1110 includes resource-host map 1205. Resource-host map 1205 maps resources to triplets specifying where to find instances of each resource. Each triplet specifies the physical host on which the resource can be found, the name of the resource on that host, and any attributes applicable to the instance of the resource on the host. For example, in resource-host map 1205, entry 1210 shows that Resource$_1$ can be found on hosts Host$_1$, Host$_2$, and Host$_3$ under the names HRN$_1$, HRN$_2$, and HRN$_3$, respectively, entry 1215 shows that Resource$_2$ can be found on hosts Host$_1$ and Host$_3$ under the names HRN$_4$ and HRN$_5$, respectively, etc.

The attribute element of each triplet in resource-host map 1205 can be unique to that resource instance. For example, if the desired resource is a printer, one printer may be able to process PostScript® jobs, whereas another printer may be able to print in color. (PostScript is a registered trademark of Adobe Systems Incorporated.) These features can be specified as attributes of the resource instance, and can vary with each resource instance.

In the preferred embodiment the volume location service simply returns to a client all resource instance triplets and lets the client decide which resource instance to use. But a person skilled in the art will recognize that other implementations are possible. For example, the client can specify to the volume location service an attribute, or more generally a filter, along with the desired resource. The volume location service can then return to the client only instances of the resource satisfying the specified attribute. As an example, a client can specify to the volume location service that a particular desired volume instance be writeable. The volume location service can then return to the client only resource instance triplets where the attribute includes write-access to the volume instance. On the other hand, if the client only needs to be able to read the contents of the volume instance, the volume location service can return any instance of the volume that is marked as being readable.

Figure 13:
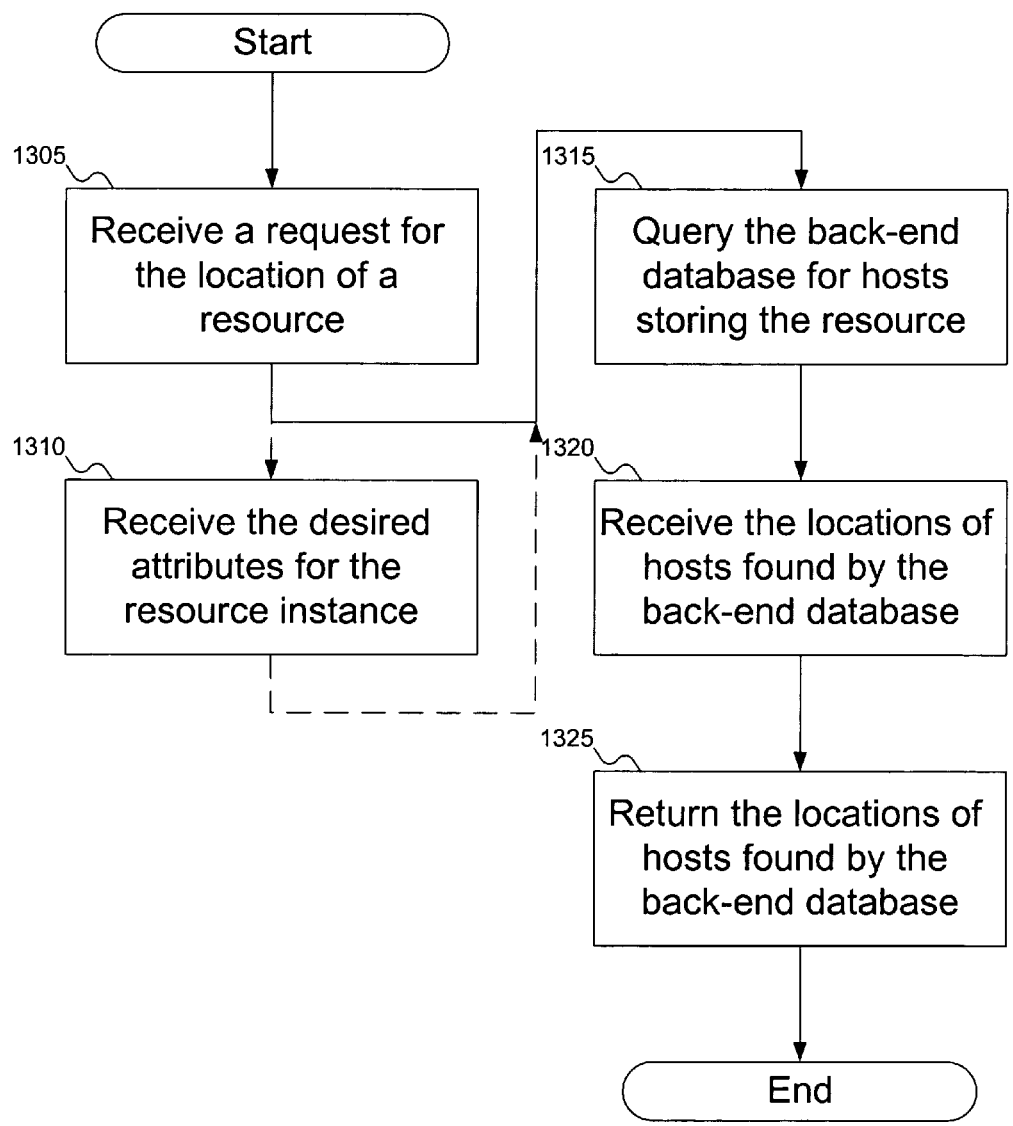
FIG. 13 is a flowchart showing how a volume location service of FIG. 12 processes a request for an instance of a resource according to the preferred embodiment.

FIG. 13 is a flowchart showing how a volume location service of FIG. 12 processes a request for an instance of a resource according to the preferred embodiment. At step 1305, the volume location service receives a request for a host storing an instance of a desired resource. At step 1315, the volume location service queries the back-end database for hosts storing the resource. At step 1320, the volume location service receives from the back-end database the hosts storing instances of the desired resource with the desired attributes. Finally, at step 1325, the volume location service returns to the client the database records containing resource instance triplets of the desired resource: that is, the hosts on which instances of the resource are stored, the names of the resource instances on the hosts, and any attributes applicable to the individual resource instances.

As discussed above with reference to FIG. 12, in an alternative embodiment the client can request an instance of the resource having a specific attribute. In this embodiment, the volume location service receives the desired resource attribute from the client at step 1310, along with the request to locate resource instances. Then, step 1315 is modified to query the back-end database for hosts storing instances of the resource with the desired attribute.

Figure 14:
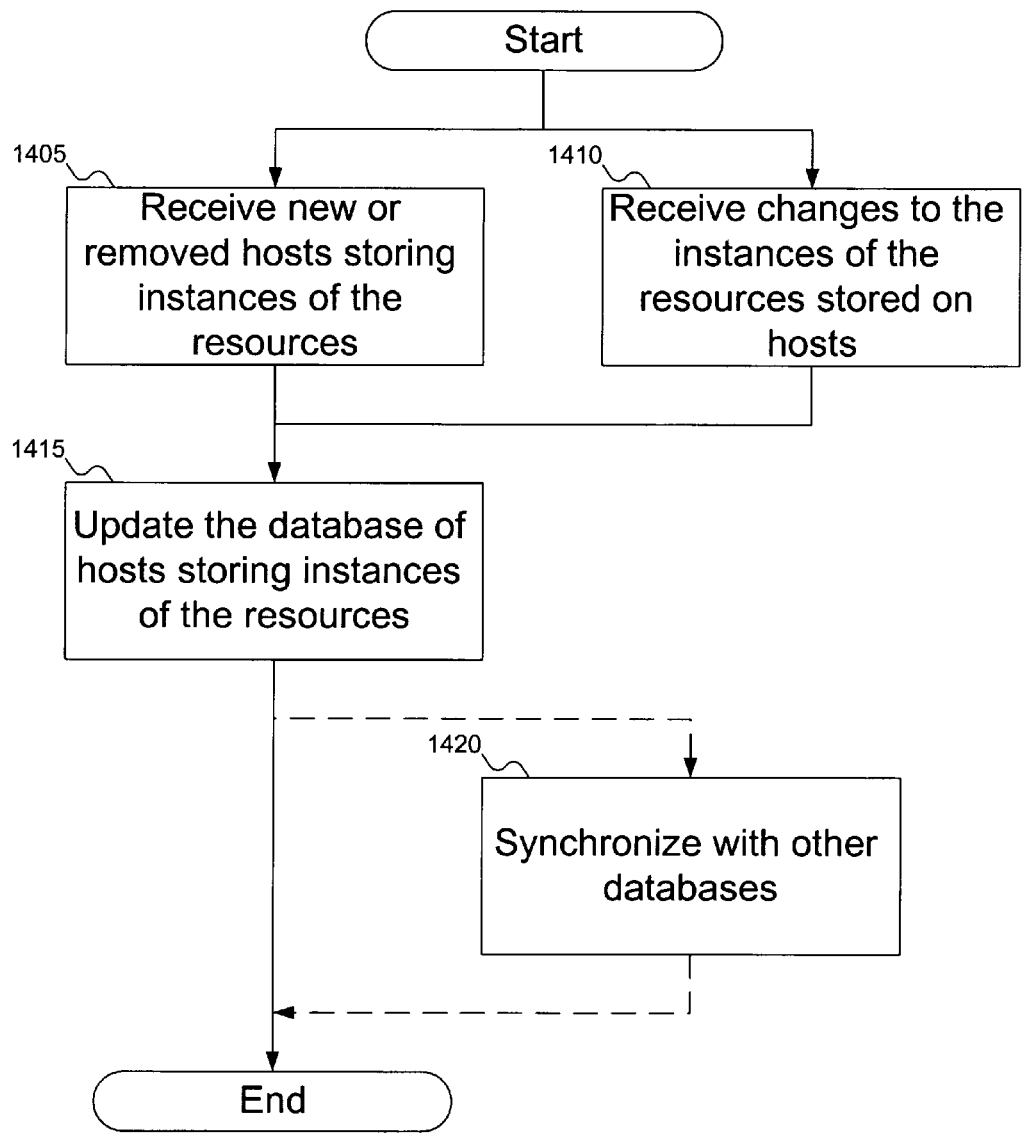
FIG. 14 is a flowchart showing how the database of the volume location service of FIG. 12 updates itself to accurately reflect the state of a volume locatable by the volume location service according to the preferred embodiment.

FIG. 14 is a flowchart showing how the database of the volume location service of FIG. 12 updates itself to accurately reflect the state of a volume locatable by the volume location service according to the preferred embodiment. First, the back-end database must receive instructions to update itself. These instructions can come from another back-end database (i.e., an instruction to synchronize with another database), or can come from a system administrator making changes to the hosts storing resources the volume location service locates. (See above with reference to FIG. 7 for more information.) The instructions can be of two types: the instructions can be to change (i.e., add or delete) hosts storing the resource instances (shown in step 1405), or the instructions can be to change the instances of resources on the host (shown in step 1410). Changes to the resource instances can include adding or deleting a resource instance, and changing the attributes of an existing resource instance. The instructions can also be a combination of the two types of instructions shown in steps 1405 and 1410. At step 1415, the back-end database performs the updates as specified in steps 1405 and 1410. Finally and optionally, at step 1415 the back-end database can propagate the instructions to other databases (i.e., instruct other databases to synchronize with it). The specifics of the instructions themselves and how the instructions are propagated are database dependent and are not shown here.

The volume location service is a distributed, message-based network service that allows any node in the network to find the set of locations where a volume exists, as well as the type of each volume instance (read-only, read-write, . . . ). This implementation provides improved scalability and manageability over the prior art. This implementation: (1) ties in with the management context concept described above; (2) provides a means to select different back-end database implementations to meet the needs of the specific environment in which it operates; and (3) stores the list of servers that provide volume location services in a robust central location that is accessible to all servers (the directory).

Because the implementation is tied to the management context, there is not one Volume Location Database for the whole world—there is one per management context. This provides clear scalability advantages, as the separate databases are smaller and therefore faster to access and easier to back up and restore than a single large database would be.

The ability to plug in different back-end databases means that an administrator for a particular management context can select the database that best meets his or her needs in terms of reliability, availability, communication overhead, how tightly synchronized the database replicas are, and any other factors that may be relevant. For some environments (e.g., high-speed local network), a quorum replication method may be appropriate while in others (e.g., a WAN environment), a more loosely-coupled database with less network overhead may be better. An implementation such as exists in the prior art that is based on a single back-end implementation cannot provide the ability to tailor the installation to the environment.

Because all the servers that store volume location services are listed in a central location, it is not necessary to distribute the information about where volume location services are located to all nodes in the network that may have need to make use of the service. It also avoids having to locate the services through a broadcast mechanism, which does not scale well and does not work well in a WAN environment.

The volume location service provides advantages over alternative solutions to distributed file systems. The National Software Works (NSW) project was an early distributed operating system research project initiated in 1974 by ARPA. NSW included a Resource Catalog that implemented a global symbolic name space for objects, including files. Files and other objects could be located on various machines in the ARPANET, running various operating systems. File lookup was handled by a component called the Works Manager. The Works Manager contained a copy of the entire Resource Catalog. A component that wished to access a file sent a message to the Works Manager which then looked up the file and returned a list of descriptors for all the available physical images of the file. The requesting component would then choose an available image and copy it to its local file system by communicating with a File Package component on the machine that stored the image. So in effect, NSW provided one single global volume distributed across multiple physical machines for file storage. The centralized management nature of the Works manager (there were two Works managers per NSW system—basically a main and a backup) does not scale well, and leaves the system susceptible to communication outages—if the link to the Works Manager is down, the system becomes unusable. In contrast, the volume location service is easily scalable, as each volume location service is only required to support a portion of the DFS. Further, introducing redundancy into the volume location service is a simple procedure.

Cronus was a distributed operation system research project undertaken by Bolt Beranek and Newman (BBN) in the early 1980s under contract to the Rome Air Development Center (RADC). Cronus was an object-oriented system, and files were one type of object that could exist in the system. There was a directory, but it contained only file objects. Objects were identified by a 96-bit unique identifier. 16 bits of this identifier contained a host address, which was used as a hint as to the object's location. All object access occurred though a component known as the Operation Switch. When a program performed an operation on an object, the Operation Switch on that machine would attempt to access the object on the host identified in the unique identifier by contacting the specified machine's operation switch. If the object was not known by that host (perhaps because it had been moved), the Operation Switch would broadcast a Locate message on the network. This message would be received by all other Operation Switches and they would determine whether the specified object was hosted on their machine and if so, send a response to the originating Operation Switch. This solution does not scale well and does not work well in a WAN environment, where it is usually difficult to send broadcast messages. In contrast, the volume location service does not require any broadcast messages to be sent: clients communicate directly with the volume location service and the desired resource instance. Further, as discussed above, the volume location service is easily scalable.

The AFS-3 file system from Transarc Corporation had a volume location service that is in many ways similar to the volume location service described herein. However, there are significant differences. AFS-3 provided a single back-end database implementation that was not pluggable. It did not have a directory service available to tie the service into. AFS-3 used a configuration file with a well-known name to find volume location servers. In contrast, the volume location service described herein is tied into an available directory service, without relying on a single back-end database. Further, the names of the servers storing the volume location services are not fixed, generalizing the solution.

AFS-3 had a notion of volume type that applies to all instances of a volume. AFS-3 did not recognize that different volume instances could be of different types. It appears that read-write volumes could have "child" volumes, which were considered different volumes, but could be read-only or backup copies of the main read-write volume. In contrast, the volume location service described herein allows for different volume instances to have different types.

Microsoft Corporation describes its distributed file system as using something called reparse points, which are objects in the existing file system. These reparse points contain the full list of hosts where the volume instances can be found. Thus, a distributed file system volume is "mounted" in an existing file system directory, and if a volume moves or a new instance is added, it will be necessary to modify the reparse point itself. In the general case, this would be a major undertaking, as there could be many instances of different reparse points scattered throughout the entire file system. Microsoft solves this problem by only allowing reparse points to exist at one point in the directory tree. The use of junctions is more general, as junctions can appear as directories anywhere in the file system and allow the physical location information to be updated in a single place for all volume references.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An apparatus providing a location service for locating at least one instantiation of a resource on a computer network, the apparatus comprising:
   an interface for communicating with the location service;
   a pluggable back-end database for storing locations of the instantiations of the resource selected from a plurality of pluggable back-end databases, each of the plurality of pluggable back-end databases capable of processing a request for a location of an instance of a resource via the interface;
   means for querying the pluggable back-end database for at least one host storing the instantiation of the resource and specifying a filter for the pluggable back-end database; and
   means for returning a record in the pluggable back-end database through the interface, the record including the host storing the resource instantiation that satisfies the filter and an attribute associated with the resource instantiation.

2. An apparatus according to claim 1, wherein the pluggable back-end database includes attributes of each resource instantiation.

3. An apparatus according to claim 1, the location service further comprising a synchronization module for synchronizing the plurality of pluggable back-end databases.

4. An apparatus according to claim 1, wherein the plurality of pluggable back-end databases includes at least two different back-end database implementations.

5. An apparatus according to claim 1, wherein the back-end database includes functions for accessing the back-end database through the interface.

6. An apparatus according to claim 1, wherein the interface includes an asynchronous messaging system for communicating with the location service.

7. A location service method for locating at least one instantiation of a resource, the method comprising:
   selecting a back-end database from a plurality of back-end databases, each of the plurality of back-end databases capable of responding to a query for a location of an instance of the resource;
   coupling the back-end database to an interface;
   receiving a request for the location of the resource at the interface, including receiving a filter for the first resource instantiation;
   querying the back-end database for at least a first host storing a first resource instantiation that satisfies the filter; and
   returning at least one location of the first host storing the first resource instantiation.

8. A location service method according to claim 7, the method further comprising returning an attribute associated with the first resource instantiation on the first host.

9. A computer readable medium containing a program implementing a location service method to locate at least one instantiation of a resource, the program comprising:
   selection software to select a back-end database from a plurality of back-end databases, each of the plurality of back-end databases capable of responding to a query for a location of an instance of the resource;
   coupling software to couple the back-end database to an interface;
   reception software to receive a request for location of the resource at the interface, including attribute reception software to receive a filter for the first resource instantiation;
   query software to query the back-end database for a first host storing a first resource instantiation that satisfies the filter; and
   return software to return at least a location of the first host storing the first resource instantiation from the location service.

10. A computer-readable medium containing a program according to claim 9, the program further comprising second return software to return an attribute associated with the first resource instantiation on the first host.

11. A system for using a location service to locate a resource, the system comprising:
   a network including at least two computers;
   a distributed filed system distributed across the network;
   a resource accessible via the network;
   software implementing the location service stored on at least one of the computers, the location service software including a pluggable back-end database, the pluggable back-end database selected from a plurality of pluggable back-end databases, each of the pluggable back-end databases storing locations of instances of the resource; and
   query means for querying the location service software for the location of instances of the resource that stratifies a filter.

12. A system according to claim 11, wherein:
   the apparatus further comprises a description of an attribute for controlling the use of the location service software; and
   the query means including using means to use the attribute description for controlling the use of the location service software.

13. A system according to claim 11, wherein a subset of the network is defied by a management context.

14. A system according to claim 13, wherein the management context includes means for locating the location service.

15. A system according to claim 11, further comprising utilization means for utilizing a resource instance returned from the location service software in response to the query.

* * * * *